US012589941B2

(12) United States Patent     (10) Patent No.:     US 12,589,941 B2
Brady et al.                      (45) Date of Patent:        Mar. 31, 2026

(54) FLEXIBLE, ROBOTIC AUTOMATED STORAGE AND RETRIEVAL SYSTEM

(71) Applicant: Amazon Technologies, Inc., Seattle, WA (US)

(72) Inventors: Tye Brady, Southborough, MA (US); Gregory Longtine, Sudbury, MA (US); Timothy Stallman, Groton, MA (US)

(73) Assignee: Amazon Technologies, Inc., Seattle, WA (US)

( * ) Notice:    Subject to any disclaimer, the term of this patent is extended or adjusted under 35 U.S.C. 154(b) by 1355 days.

(21) Appl. No.: 17/035,110

(22) Filed:    Sep. 28, 2020

(65)            Prior Publication Data

US 2022/0097969 A1      Mar. 31, 2022

(51) Int. Cl.
B65G 1/06        (2006.01)
B65G 1/04        (2006.01)
B65G 1/137       (2006.01)
B66F 9/06        (2006.01)

(52) U.S. Cl.
CPC ...........  B65G 1/065 (2013.01); B65G 1/0471 (2013.01); B65G 1/1378 (2013.01); B66F 9/063 (2013.01)

(58) Field of Classification Search
CPC .... B65G 1/065; B65G 1/0471; B65G 1/1378; B65G 1/0492; B66F 9/063
See application file for complete search history.

(56)            References Cited

U.S. PATENT DOCUMENTS

| | | | | |
|---|---|---|---|---|
| 9,309,050 | B2 * | 4/2016 | Toebes ................. | B65G 1/0492 |
| 10,217,074 | B1 | 2/2019 | Stallman et al. | |
| 10,919,747 | B2 | 2/2021 | Kalm et al. | |
| 11,235,930 | B2 * | 2/2022 | Bastian, II ........... | B25J 15/0616 |
| 2014/0288696 | A1 | 9/2014 | Lert | |
| 2018/0037410 | A1 * | 2/2018 | DeWitt ................... | B07C 3/087 |
| 2018/0079626 | A1 | 3/2018 | Brady et al. | |
| 2018/0082162 | A1 | 3/2018 | Durham et al. | |
| 2021/0261331 | A1 * | 8/2021 | Otto ..................... | B65G 1/0421 |

FOREIGN PATENT DOCUMENTS

| | | |
|---|---|---|
| CA | 2795022 A1 | 10/2011 |
| CA | 2799871 A1 | 6/2013 |
| DE | 102010015054 A1 | 11/2011 |
| EP | 2607292 A1 | 6/2013 |
| EP | 3696116 A1 | 8/2020 |
| WO | 2018053236 A1 | 3/2018 |

OTHER PUBLICATIONS

International Search Report and Written Opinion dated Jan. 10, 2022, issued in corresponding International Application No. PCT/US2021/051969.

* cited by examiner

*Primary Examiner* — Kyle O Logan

(74) *Attorney, Agent, or Firm* — Athorus, PLLC

(57)            ABSTRACT

Flexible, robotic automated storage and retrieval systems and processes may include one or more blocks of shelving systems, each block including a plurality of floors, and each floor including a plurality of storage grid locations for respective totes. A plurality of robotic drive units may traverse the storage grid locations using a plurality of highway grids and elevators to move totes between processing stations and storage grid locations. The freely movable robotic drive units and totes enable high flexibility, modularity, scalability, and serviceability of the flexible, robotic automated storage and retrieval systems.

15 Claims, 13 Drawing Sheets

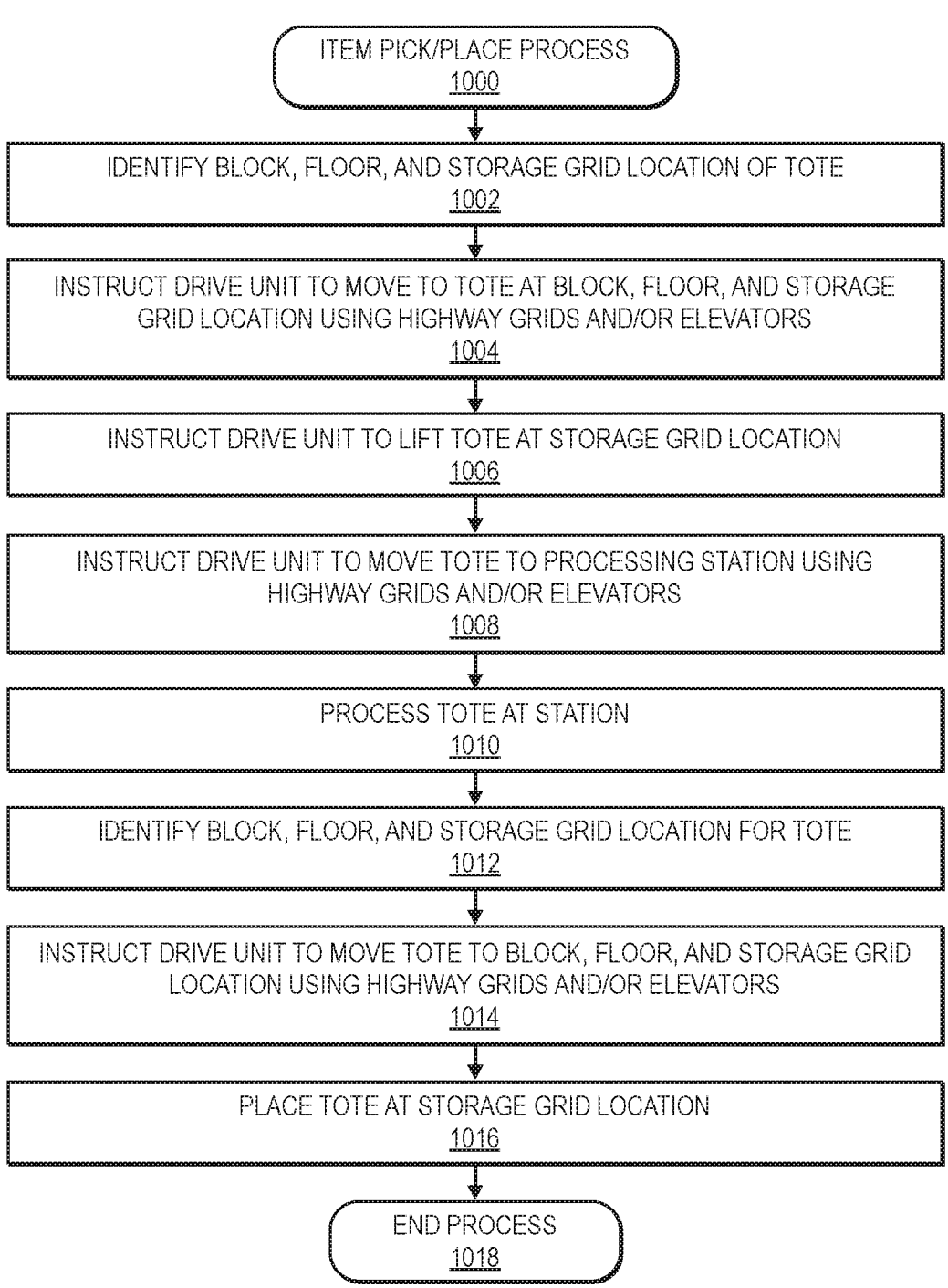

ITEM PICK/PLACE PROCESS
1000

IDENTIFY BLOCK, FLOOR, AND STORAGE GRID LOCATION OF TOTE
1002

INSTRUCT DRIVE UNIT TO MOVE TO TOTE AT BLOCK, FLOOR, AND STORAGE
GRID LOCATION USING HIGHWAY GRIDS AND/OR ELEVATORS
1004

INSTRUCT DRIVE UNIT TO LIFT TOTE AT STORAGE GRID LOCATION
1006

INSTRUCT DRIVE UNIT TO MOVE TOTE TO PROCESSING STATION USING
HIGHWAY GRIDS AND/OR ELEVATORS
1008

PROCESS TOTE AT STATION
1010

IDENTIFY BLOCK, FLOOR, AND STORAGE GRID LOCATION FOR TOTE
1012

INSTRUCT DRIVE UNIT TO MOVE TOTE TO BLOCK, FLOOR, AND STORAGE GRID
LOCATION USING HIGHWAY GRIDS AND/OR ELEVATORS
1014

PLACE TOTE AT STORAGE GRID LOCATION
1016

END PROCESS
1018

FIG. 10

FLEXIBLE, ROBOTIC AUTOMATED STORAGE AND RETRIEVAL SYSTEM

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

BRIEF DESCRIPTION OF THE DRAWINGS

FIG. 10 is a flow diagram illustrating an example item pick/place process, in accordance with implementations of the present disclosure.

DETAILED DESCRIPTION

Figure 1:
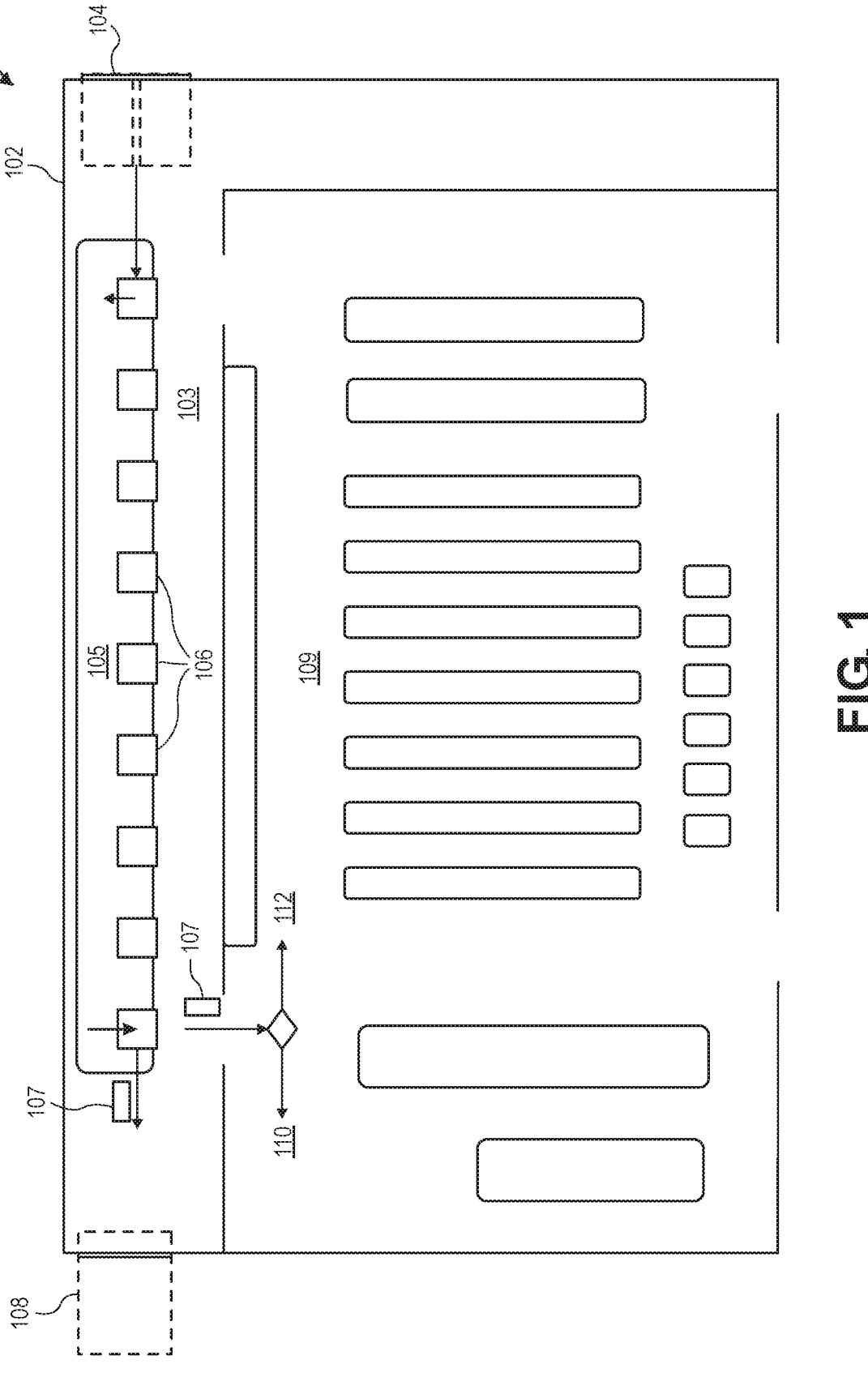
FIG. 1 is a schematic, overhead view diagram of an example environment utilizing a flexible, robotic automated storage and retrieval system, in accordance with implementations of the present disclosure.

As is set forth in greater detail below, implementations of the present disclosure are directed to automated storage and retrieval systems and processes, using one or more robotic drive units and totes, that may be configured to increase storage density and throughput, while also improving flexibility, modularity, scalability, and serviceability associated with such automated storage and retrieval systems and processes.

In example embodiments, the automated storage and retrieval systems may include one or more blocks of shelving or racking systems, e.g., tear drop racking systems. Each block may include one or more floors or levels of shelves or racks that may be connected to each other via one or more elevators. In addition, each floor may include a plurality of storage grid locations connected via highway grids. Further, each storage grid location may be configured to receive a tote that may receive, contain, or carry one or more items or products, e.g., grocery, apparel, books, electronics, or various other types of items.

In example embodiments, one or more robotic drive units may be configured to traverse the blocks, floors, and storage grid locations of the shelving systems via the highway grids and/or elevators, e.g., using imaging sensors that detect fiducial markers placed on the floors, and/or using various other types of sensors to detect and determine positions within the shelving systems. In addition, the robotic drive units may be configured to lift, move, and/or place totes within the blocks, floors, and storage grid locations of the shelving systems. Further, the robotic drive units may communicate with a controller or control system to send and/or receive instructions, commands, and/or data to coordinate operations of the robotic drive units, elevators, processing stations, and/or other components of the automated storage and retrieval systems.

In additional example embodiments, the blocks, floors, and storage grid locations of the shelving systems may include one or more service access zones or areas, e.g., human-accessible or machine-accessible stairways, ladders, catwalks, or regions adjacent to or within the blocks, floors, storage grid locations, highway grids, and/or elevators. In this manner, each storage grid location, portion of a highway grid, and/or elevator within any block and/or floor of the shelving systems may be accessible for service during operation of the automated storage and retrieval systems.

In further example embodiments, the blocks of shelving systems may also include one or more processing stations, e.g., human-operated or automated stations to process one or more items within the totes. Each processing station may be configured to perform one or more processes, including receiving or stowing items to totes associated with the shelving systems, picking or placing items to totes or carts associated with the shelving systems, sorting or storing groups of items, such as customer orders, to totes or carts associated with the shelving systems, and/or various other processes.

Using the automated storage and retrieval systems and processes described herein, storage density within an environment, e.g., a material handling facility, may be increased by storing items to totes within multiple blocks, floors, and storage grid locations of shelving systems. In addition, throughput may be increased by utilizing multiple robotic drive units to move totes within the multiple blocks, floors, and storage grid locations of shelving systems, as well as multiple processing stations to process items carried by totes. Further, flexibility of automated storage and retrieval systems and processes may be improved by utilizing substantially freely movable robotic drive units and totes within the multiple blocks, floors, and storage grid locations of shelving systems. Moreover, modularity and scalability of automated storage and retrieval systems and processes may be improved by adjusting or modifying size, scale, height, or numbers of blocks, floors, storage grid locations, highway grids, elevators, robotic drive units, and/or totes, and/or other parameters of the shelving systems as desired. Furthermore, serviceability of automated storage and retrieval systems and processes may be improved by providing access to substantially all portions of the multiple blocks, floors, and storage grid locations of shelving systems during operation of such systems.

FIG. 1 is a schematic, overhead view diagram 100 of an example environment utilizing a flexible, robotic automated storage and retrieval system, in accordance with implementations of the present disclosure.

The example environment 102 may comprise a grocery store, retail store, warehouse, storage facility, or other structure or building. As shown in FIG. 1, the example environment 102 may comprise a grocery store with a back-of-store area 103 and a front-of-store area 109. Generally, only employees or other authorized personnel may be permitted to enter the back-of-store area 103, and customers may be permitted to enter the front-of-store area 109 to browse, select, or purchase one or more items or products, e.g., grocery, apparel, books, electronics, or various other types of items.

Within the back-of-store area 103, the example flexible, robotic automated storage and retrieval system 105 may be utilized to store and retrieve the one or more items or products via one or more processing stations 106. Further details of the example flexible, robotic automated storage and retrieval system 105 and processing stations 106 are described herein. For example, the various items or products may be received at one or more docks 104 associated with the back-of-store area 103, e.g., from manufacturers, wholesalers, distributors, or other suppliers or sources. Then, the items or products may be processed at processing stations 106 for storage within the flexible, robotic automated storage and retrieval system 105.

When one or more items or products are to be retrieved from the flexible, robotic automated storage and retrieval system 105, the items or products may be processed at processing stations 106 and transferred to one or more totes or carts 107, e.g., order totes or carts, restock totes or carts, and/or customer totes or carts. In example embodiments in which items have been ordered for delivery to a customer, the order totes or carts 107 may be transferred to an outbound dock 108 for delivery via one or more vehicles. In example embodiments in which items have been ordered for provision to a customer within the front-of-store area 109, the customer totes or carts 107 may be transferred 110 to the front-of-store area 109 for use by the customer, e.g., to continue or finish shopping for one or more items or products within the front-of-store area 109. In example embodiments in which items are needed to restock the front-of-store area 109, the restock totes or carts 107 may be transferred 112 to the front-of-store area 109 for use by employees or personnel, e.g., to restock or replenish shelves with items or products within the front-of-store area 109.

The flexible, robotic automated storage and retrieval system 105 may be sized or scaled to fit and operate within any available space of a back-of-store area 103 within an environment 102, such as a grocery store, retail store, or any other environment. In addition, the size or scale of the flexible, robotic automated storage and retrieval system 105 may be adjusted or modified over time as needed, e.g., based on available space, supply, demand, throughput, or other factors. Further, as described herein, the flexible, robotic automated storage and retrieval system 105 may be implemented to support and improve existing item or product paths, e.g., complete delivery to remote or online customers, partial delivery to in-store customers, or replenishment of portions of the environment. Various other item or product paths may also be supported by the flexible, robotic automated storage and retrieval system 105 described herein.

Figure 2A:
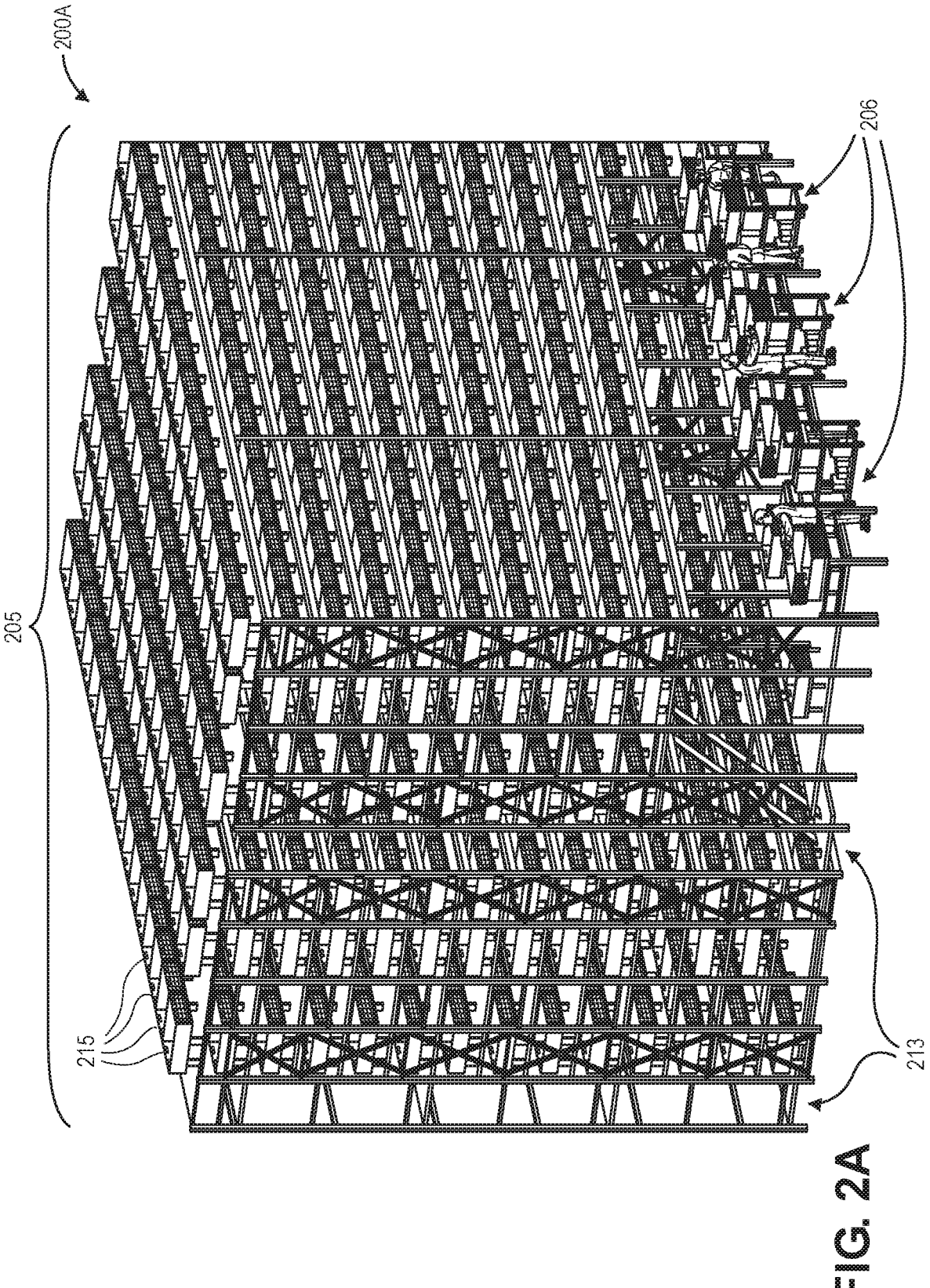
FIG. 2A is a schematic, front perspective view diagram of an example flexible, robotic automated storage and retrieval system, in accordance with implementations of the present disclosure.
Figure 2B:
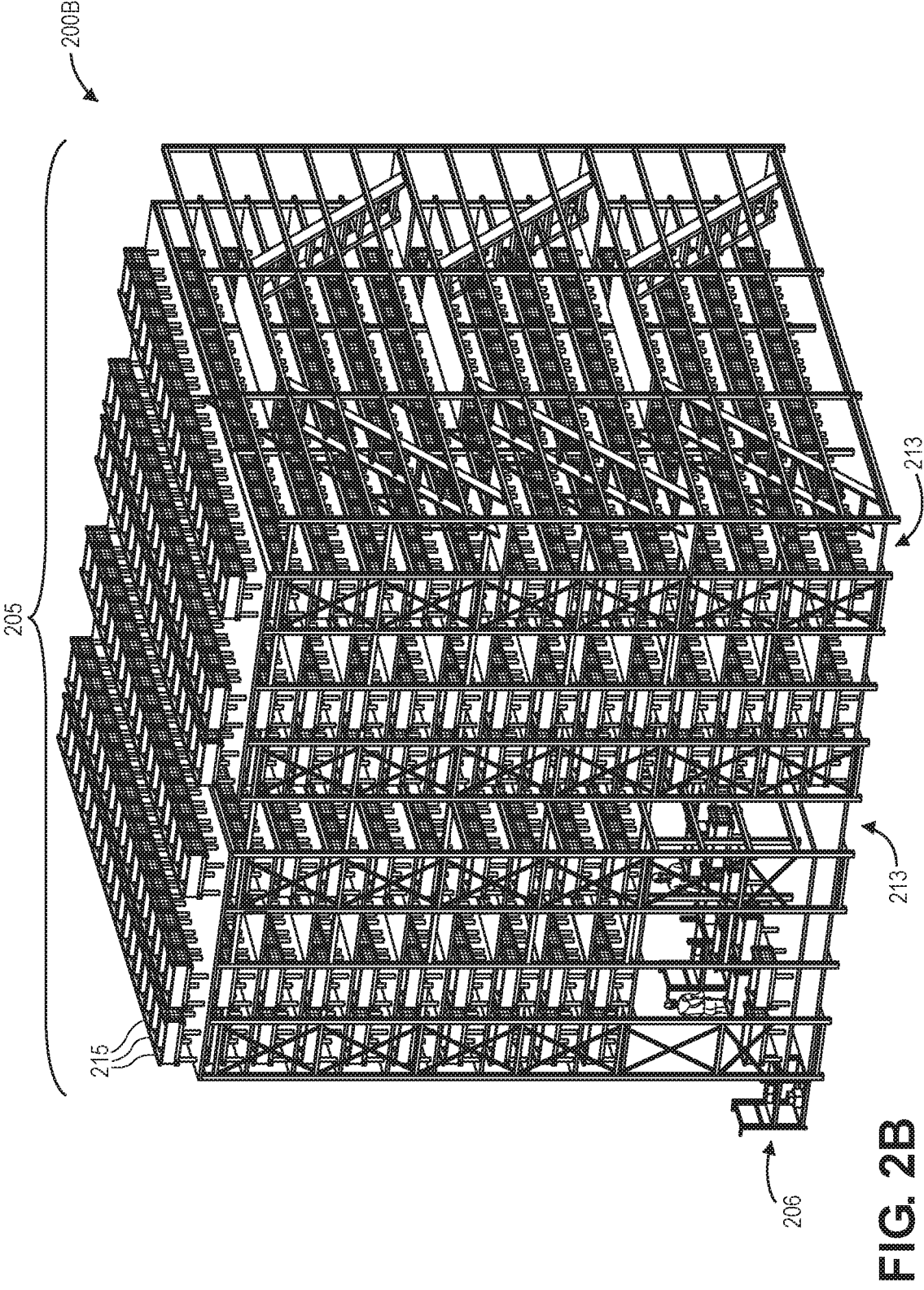
FIG. 2B is a schematic, rear perspective view diagram of an example flexible, robotic automated storage and retrieval system, in accordance with implementations of the present disclosure.

FIG. 2A is a schematic, front perspective view diagram 200A of an example flexible, robotic automated storage and retrieval system, in accordance with implementations of the present disclosure. FIG. 2B is a schematic, rear perspective view diagram 200B of an example flexible, robotic automated storage and retrieval system, in accordance with implementations of the present disclosure.

As shown in FIGS. 2A and 2B, an example block of the flexible, robotic automated storage and retrieval system 205 may include a plurality of floors or levels. In one example embodiment, each block may have a footprint of approximately forty three feet wide by forty feet deep, and each block may extend vertically approximately thirty feet high. In addition, each block may have approximately thirteen floors or levels. In other example embodiments, each block may have various different dimensions associated with width, depth, height, and/or number of floors. Further, multiple blocks, e.g., two, five, ten, or more blocks, may be positioned side by side to increase or modify the available storage within the system, thereby providing modularity and scalability. Moreover, one or more blocks, or portions thereof, may include different temperature zones to enable storage of different types of items, e.g., perishable, frozen, produce, or other types of items.

Each floor or level of the example block may include a plurality of storage grid locations, and each storage grid location may be sized or configured to receive a respective tote 215. In addition, the plurality of storage grid locations may be connected via a plurality of highway grids that enable movement of robotic drive units and totes between various portions of the block. Further, each floor or level of the example block may be connected to other floors or levels via one or more elevators. For example, the elevators may comprise flat plates, decks, or surfaces that may be moved vertically between floors using various types of actuators, e.g., chain drives, pulley drives, screw drives, geared mechanisms, linear actuators, or other actuators or mechanisms.

In an example embodiment, each lower floor, e.g., the lowest three floors, of each block may include approximately forty two storage grid locations connected by highway grids, such that each lower floor may receive and store approximately forty two totes 215. In addition, each upper floor, e.g., the highest ten floors, of each block may include approximately ninety storage grid locations connected by highway grids, such that each upper floor may receive and store approximately ninety totes 215. As a result, an example block having thirteen floors may include approximately one thousand twenty six storage grid locations that may receive and store approximately one thousand twenty six totes 215.

In other example embodiments, each block may have various other numbers, configurations, or arrangements of storage grid locations, totes, elevators, and highway grids.

In addition, the example block may include one or more processing stations 206 associated with the lowest floor of the flexible, robotic automated storage and retrieval system 205, e.g., positioned along an edge or side, or at least partially around a periphery of the system. For example, each processing station 206 may enable various processing associated with totes and/or items contained within totes by human associates, robotic or automated apparatus, or combinations thereof. Example processes or operations may include receiving or stowing items to totes, picking or removing items from totes, placing, sorting, or storing items in carts, order totes, customer totes, and/or restock totes, and/or various other processes or operations. In other example embodiments, each block may have various other numbers, configurations, or arrangements of processing stations.

Further, the example block may include one or more service access zones or areas 213. For example, the service access zones 213 may include stairways, ladders, catwalks, or other regions or areas that may enable access by humans and/or machines. The service access zones 213 may be adjacent to various portions of the example block, and/or the service access zones 213 may be positioned at least partially within various portions of the example block. In some example embodiments, the service access zones 213 may enable access by humans using various machines, e.g., bucket cranes, cherry pickers, or other mobile, vertical lift mechanisms. In this manner, substantially all portions of an example block may be accessible for service while maintaining operation of the flexible, robotic automated storage and retrieval system 205. In other example embodiments, each block may have various other numbers, configurations, or arrangements of service access zones.

Figure 3A:
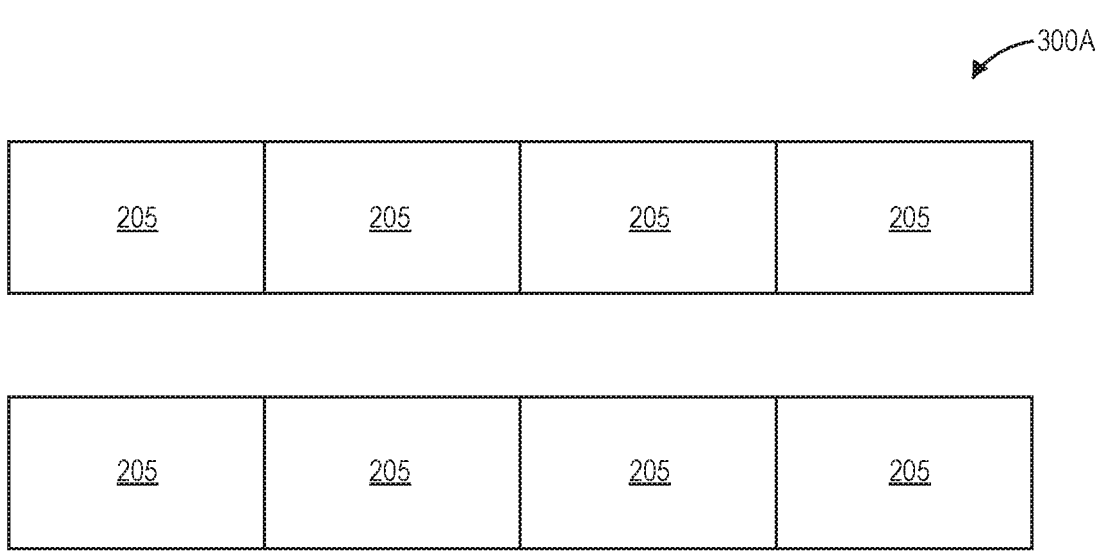
FIG. 3A is a schematic, overhead view diagram of another example flexible, robotic automated storage and retrieval system, in accordance with implementations of the present disclosure.

FIG. 3A is a schematic, overhead view diagram 300A of another example flexible, robotic automated storage and retrieval system, in accordance with implementations of the present disclosure.

In example embodiments, multiple blocks 205, e.g., two, five, ten, or more blocks, may be positioned side by side to increase or modify the available storage within the system, thereby providing modularity and scalability. For example, as shown in FIG. 3A, a plurality of blocks, e.g., four blocks 205, may be connected side by side to create a first row of blocks having a plurality of floors, a plurality of storage grid locations, a plurality of highway grids, a plurality of elevators, a plurality of processing stations, and/or a plurality of service access zones. In addition, a plurality of blocks, e.g., four blocks 205, may be connected side by side to create a second row of blocks having a plurality of floors, a plurality of storage grid locations, a plurality of highway grids, a plurality of elevators, a plurality of processing stations, and/or a plurality of service access zones. Various other numbers, shapes, combinations, configurations, or arrangements of blocks may also be possible.

In some example embodiments, individual blocks within each row of blocks may have the same number, dimensions, configuration, or arrangement of floors, storage grid locations, highway grids, elevators, processing stations, and/or service access zones. In other example embodiments, individual blocks within each row of blocks may have the different numbers, dimensions, configurations, or arrangements of floors, storage grid locations, highway grids, elevators, processing stations, and/or service access zones.

Figure 3B:
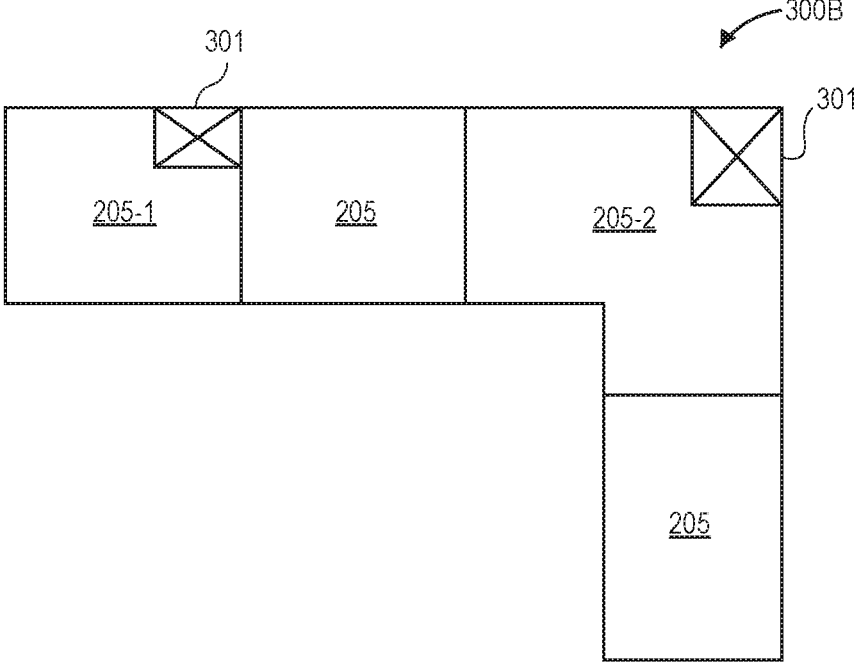
FIG. 3B is a schematic, overhead view diagram of yet another example flexible, robotic automated storage and retrieval system, in accordance with implementations of the present disclosure.

FIG. 3B is a schematic, overhead view diagram 300B of yet another example flexible, robotic automated storage and retrieval system, in accordance with implementations of the present disclosure.

In example embodiments, multiple blocks 205, e.g., two, five, ten, or more blocks, may be positioned in various shapes, configurations, or arrangements to increase or modify the available storage within the system, thereby providing modularity and scalability. For example, as shown in FIG. 3B, a plurality of blocks, e.g., four blocks 205, 205-1, 205-2, may form an L-shape having a plurality of floors, a plurality of storage grid locations, a plurality of highway grids, a plurality of elevators, a plurality of processing stations, and/or a plurality of service access zones.

In some example embodiments, individual blocks within each row of blocks may have the same number, dimensions, shape, configuration, or arrangement of floors, storage grid locations, highway grids, elevators, processing stations, and/or service access zones. In other example embodiments, individual blocks within each row of blocks may have the different numbers, dimensions, shapes, configurations, or arrangements of floors, storage grid locations, highway grids, elevators, processing stations, and/or service access zones.

For example, the plurality of blocks may be formed in various desired dimensions, shapes, or sizes in order to fit within an available space of a building, facility, or structure. Further, portions of individual blocks may be modified or adapted to conform with portions of the building, facility, or structure, e.g., walls, partitions, beams, columns, restricted areas, or other space constraints. As shown in FIG. 3B, the example block 205-1 may be shaped to fit around a structural beam or column 301. In similar manner, the example block 205-2 may also be shaped to fit around a structural beam or column 301, as well as to fit within a corner of two adjoining walls of the building, facility, or structure. Various other dimensions, shapes, combinations, configurations, or arrangements of blocks may also be possible to modify or adapt the example flexible, robotic automated storage and retrieval system to an available space.

Figure 4:
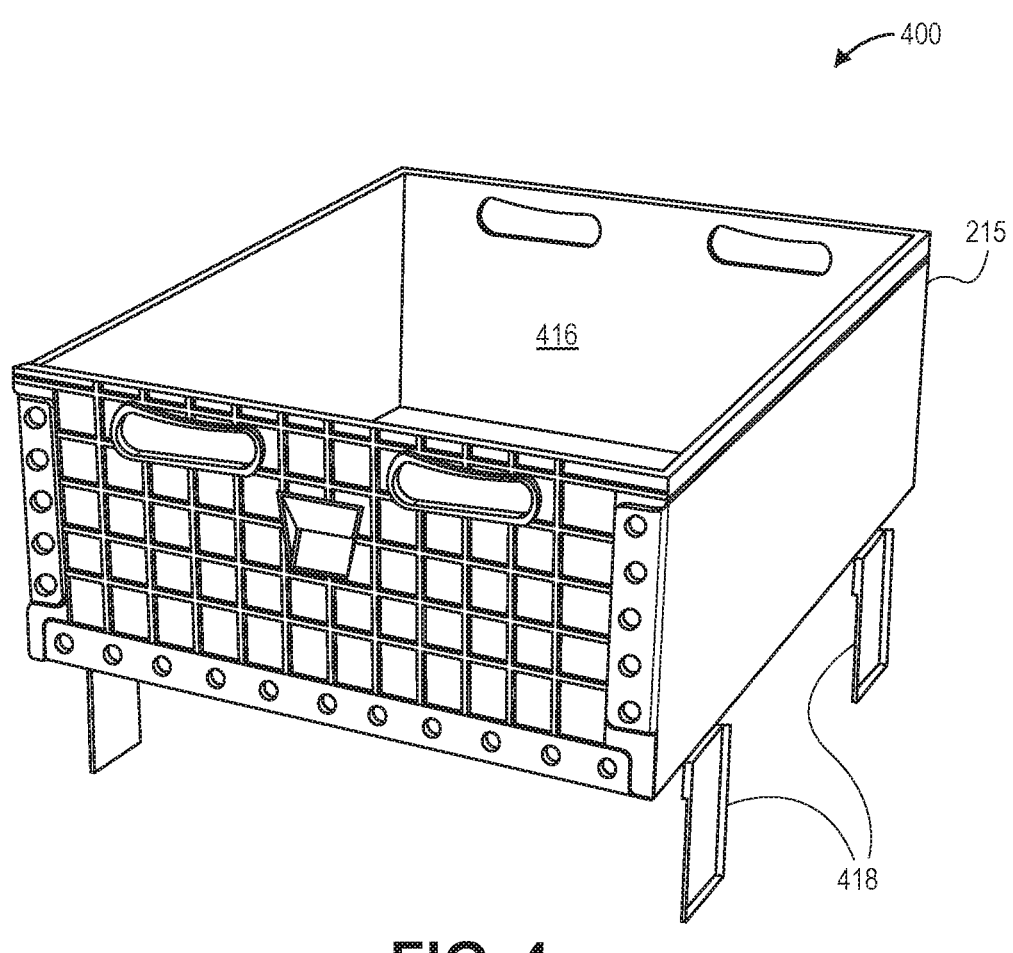
FIG. 4 is a schematic, front perspective view diagram of an example tote utilized within a flexible, robotic automated storage and retrieval system, in accordance with implementations of the present disclosure.

FIG. 4 is a schematic, front perspective view diagram 400 of an example tote utilized within a flexible, robotic automated storage and retrieval system, in accordance with implementations of the present disclosure.

The example tote 215 may comprise a plurality of walls 416, including a base, that form a container or enclosure that may receive, contain, or carry one or more items or products. In an example embodiment, the walls 416 of the tote 215 may have a footprint of approximately twenty six inches wide by thirty two inches deep, and the walls 416 may extend vertically approximately twelve inches high. One or more walls 416 may also include holes or slots to facilitate grasping, lifting, and movement of the tote, e.g., by human associates. In some example embodiments, one or more partitions may be added or included within the walls 416 to create individual compartments or zones within the tote 215. In other example embodiments, the walls 416 of the tote 215 may have various different dimensions associated with width, depth, and/or height.

The example tote 215 may also include a plurality of feet 418, e.g., four feet, such that the tote 215 stands via the feet 418 at a defined distance from a surface on which it is placed. In an example embodiment, the feet 418 of the tote 215 may extend vertically approximately seven inches, such that a base of the tote 215 is approximately seven inches above a surface on which the tote is placed. Further, the feet 418 may be offset outward, e.g., approximately one-half inch, from a respective outer surface of an adjacent wall 416 of the tote 215, such that multiple totes 215 may be stacked on top of each other without interference between the feet 418 of an upper stacked tote and the walls 416 of a lower stacked tote. In other example embodiments, the feet 418 of the tote 215 may have various different dimensions associated with height and/or offset.

In addition, the walls 416 and feet 418 of the tote 215 may be formed from sturdy, lightweight materials, such as plastics, cardboard, fiberboard, composites, metals, other materials, or combinations thereof. For example, the tote 215 may be designed or configured to receive, contain, or carry approximately one hundred pounds of items or products. In other example embodiments, the tote 215 may be designed or configured to carry various other amounts of load.

Figure 5:
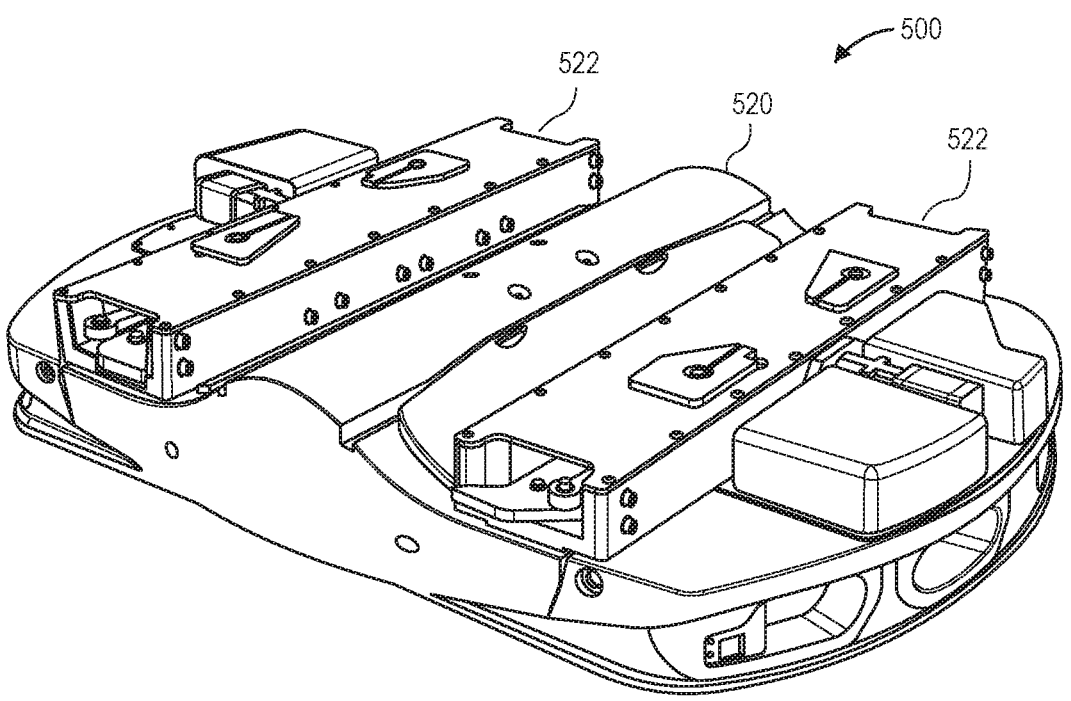
FIG. 5 is a schematic, front perspective view diagram of an example drive unit utilized within a flexible, robotic automated storage and retrieval system, in accordance with implementations of the present disclosure.

FIG. 5 is a schematic, front perspective view diagram 500 of an example drive unit utilized within a flexible, robotic automated storage and retrieval system, in accordance with implementations of the present disclosure.

As shown in FIG. 5, a robotic drive unit 520 may include a tote lift mechanism 522 and a controller (such as the control system described with respect to FIG. 11), that may include a processor, a drive mechanism controller, a power supply, a memory, a tote lift mechanism controller, and a network interface or communication device. In example embodiments, the tote lift mechanism 522 may comprise screw drives, geared mechanisms, linear actuators, or other actuators or mechanisms configured to cause vertical movement of a portion of the robotic drive unit 520 and to engage and lift a tote 215.

In example embodiments, the robotic drive unit 520 may releasably engage or couple to respective totes 215, such that the robotic drive unit 520 may perform various tasks, such as coupling to, lifting, moving, lowering, placing, and uncoupling from respective totes 215 as desired. For example, in order to engage and move a respective tote 215, a robotic drive unit 520 may position itself underneath the tote 215. Then, the tote lift mechanism 522 may move vertically to engage with an underside of a base of a tote 215 and lift the tote 215. While the tote 215 is lifted via the tote lift mechanism 522, the robotic drive unit 520 may move or transfer the tote 215 between various portions of the flexible, robotic automated storage and retrieval system. Upon reaching a destination location for the tote 215, the tote lift mechanism 522 may again move vertically to disengage with the underside of the base of the tote 215 and lower the tote 215.

In addition, the robotic drive unit 520 may be in communication with a control system (such as the control system described with respect to FIG. 12), that may be configured to send and/or receive commands, instructions, and/or data to control and coordinate operations of the robotic drive unit 520, as well as other portions of the flexible, robotic automated storage and retrieval system, such as movements to and from processing stations, movements to and from storage grid locations, movements along highway grids, movements utilizing elevators, and/or various other movements. Further, the robotic drive unit 520 may move relative to various locations within the flexible, robotic automated storage and retrieval system based in part on fiducial markers, e.g., barcodes, QR (quick response) codes, characters, symbols, radiofrequency (RFID) tags, or other identifiers, on the floors, elevators, or regions adjacent to processing stations that are detected by one or more sensors of the robotic drive unit 520. Example sensors configured to detect fiducial markers may comprise imaging sensors, infrared sensors, RFID readers, or other types of sensors.

In other example embodiments, one or more imaging sensors may also be associated with various positions or locations within the flexible, robotic automated storage and retrieval system, such that imaging data captured by such imaging sensors may be processed to detect various robotic drive units and their respective locations, with or without reference to fiducial markers or identifiers associated with particular locations. In additional example embodiments, one or more laser sensors, photoeyes, proximity sensors, radio transmitters and/or receivers, radio beacons, or other types of presence detection sensors may be associated with various positions or locations within the flexible, robotic automated storage and retrieval system, such that presence detection data captured by such sensors may be processed to detect various robotic drive units at particular locations, with or without reference to fiducial markers or identifiers associated with particular locations. In further example embodiments, robotic drive units may include motor or wheel encoders associated with drive mechanisms that are configured to measure or detect rotations of motors and/or wheels, in order to determine movements and locations of robotic drive units based on dead reckoning by processing rotation data measured by such encoders. In still further example embodiments, one or more RFID tags may be associated with particular locations within the flexible, robotic automated storage and retrieval system, and RFID readers associated with robotic drive units may detect RFID tags to determine respective locations of robotic drive units, and/or conversely, one or more RFID tags may be associated with particular robotic drive units, and RFID readers associated with various locations within the flexible, robotic automated storage and retrieval system may detect RFID tags to determine respective locations of robotic drive units. Various other types of sensors, as well as combinations of two or more different types of sensors, may be used to measure, detect, and determine movements and locations of robotic drive units within the flexible, robotic automated storage and retrieval system, in order to control and coordinate, e.g., by a controller, operations of robotic drive units within the flexible, robotic automated storage and retrieval system.

In other example embodiments, the robotic drive unit 520 may have various other shapes, sizes, configurations, or arrangements. For example, in some example embodiments, the tote lift mechanism 522 may include a self-centering configuration or mechanism, such that any tote that is lifted by the tote lift mechanism 522 may be automatically centered with respect to the robotic drive unit 520. Various other types of tote lift mechanisms may also be included in the robotic drive unit 520 described herein.

Figure 6:
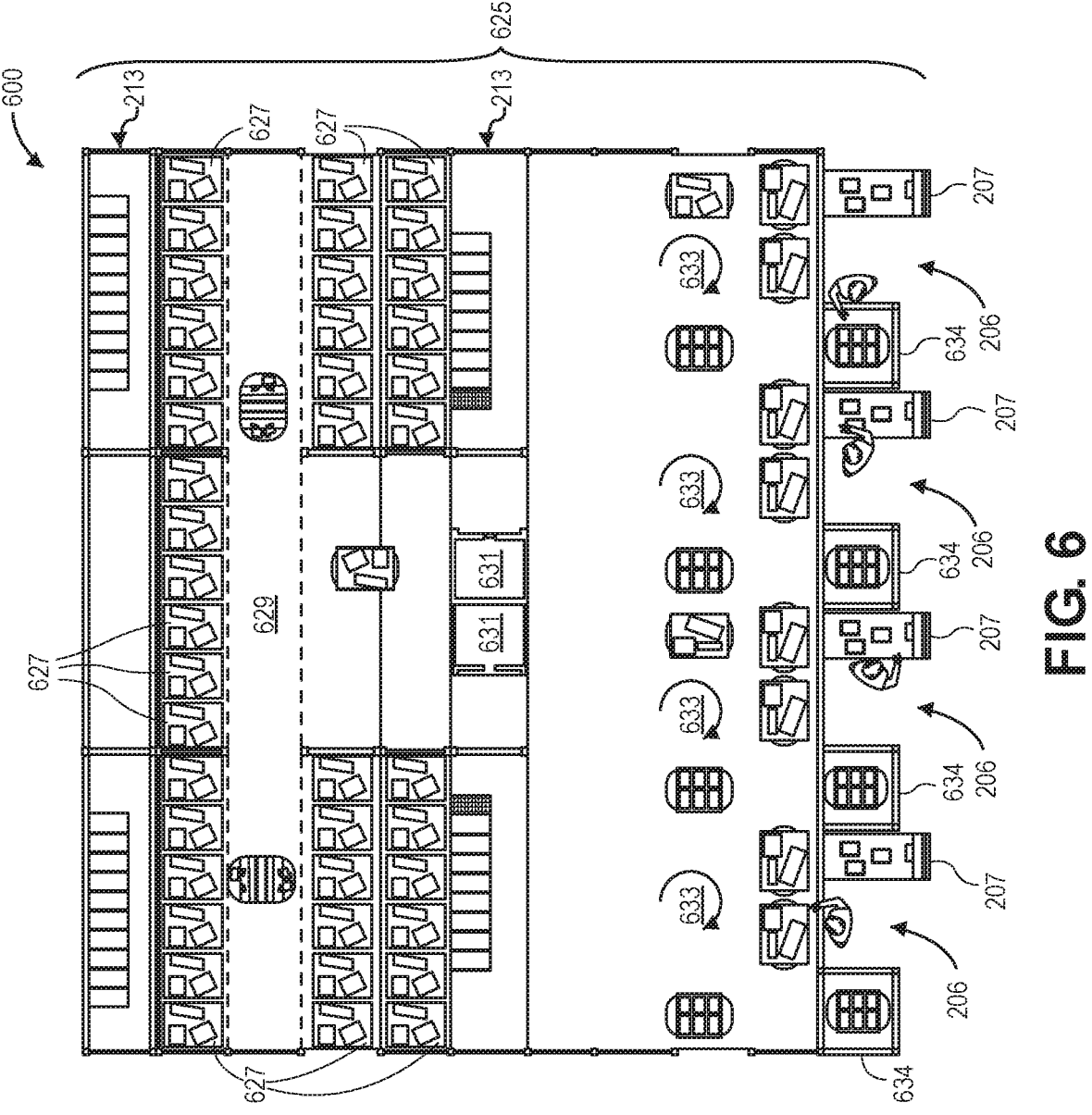
FIG. 6 is a schematic, overhead view diagram of an example lower floor of a flexible, robotic automated storage and retrieval system, in accordance with implementations of the present disclosure.

FIG. 6 is a schematic, overhead view diagram 600 of an example lower floor of a flexible, robotic automated storage and retrieval system, in accordance with implementations of the present disclosure.

An example lower floor 625 of an example block of the flexible, robotic automated storage and retrieval system 205 may include a plurality of storage grid locations 627, a plurality of highway grids 629, and one or more elevators 631. In addition, as described herein, the example lower floor 625 may include one or more service access zones 213. Further, as described herein, the lowest floor of the example block may include one or more processing stations 206.

Each storage grid location 627 may be sized or configured to receive a respective tote and to enable movement of robotic drive units and/or totes on a surface of the storage grid location 627. In addition, the highway grids 629 may be sized or configured to enable movement of robotic drive units and/or totes on surfaces of the highway grids 629 between storage grid locations 627, elevators 631, processing stations 206, and/or other portions of the block. Further, the elevators 631 may also be sized or configured to receive robotic drive units and/or totes, and enable movement of the robotic drive units and/or totes on surfaces of the elevators 631 between floors of the block. In contrast, the service access zones 213 may be restricted zones that do not allow access or movement by robotic drive units and/or totes, and may include physical barriers, walls, rails, or fences to maintain such restrictions.

The plurality of storage grid locations 627, the plurality of highway grids 629, and the one or more elevators 631 may include a plurality of fiducial markers, e.g., barcodes, QR codes, characters, symbols, RFID tags, or other identifiers, that are positioned at various locations of the floor, e.g., in one or more grid patterns on the floor that substantially match the plurality of storage grid locations 627 and corresponding portions of surfaces of the plurality of highway grids 629 and one or more elevators 631. In this manner, robotic drive units may be able to traverse among the plurality of storage grid locations 627, the plurality of highway grids 629, and the one or more elevators 631 between all floors of the block to move or transfer totes, or perform various other operations, by detecting the plurality of fiducial markers during movement to identify and maintain their respective locations within the block.

In addition, the lowest floor of the example block and regions adjacent to the processing stations 206 may also include a plurality of fiducial markers that are positioned at various locations of the floor, e.g., in one or more grid patterns on the floor. For example, when a robotic drive unit moves to and from a processing station 206, the robotic drive unit may generally move in a pattern, motion, or sequence 633 between various locations of the floor by detecting, identifying, and following the plurality of fiducial markers, e.g., between and among "entry queue" locations, "on deck" locations, "pick" locations, "place" locations 634, "exit queue" locations, and other locations. During various processing operations at the processing stations 206, a human associate may generally interact with a robotic drive unit, tote, and/or items contained therein positioned at a "pick" location directly in front of the associate when facing the block, a cart 207, tote, and/or items contained therein from which one or more items or a tote may be moved to the "pick" location and/or to which one or more items or the tote may be moved from the "pick" location, and/or a robotic drive unit, tote, and/or items contained therein positioned at the "place" location 634 with respect to which one or more items or the tote may be moved to or from the "pick" location and/or the cart 207. Further, the human associate may be separated or protected from direct interaction or contact with the robotic drive units by physical barriers, walls, rails, or fences that restrict the robotic drive units from accessing space reserved for the human associate, while still enabling the human associate to access totes and/or items contained therein that may be moved by the robotic drive units.

Although FIG. 6 illustrates a particular number, configuration, and arrangement of a lower floor 625 having storage grid locations 627, highway grids 629, elevators 631, processing stations 206, service access zones 213, and associated fiducial markers to facilitate robotic drive unit operations, in other example embodiments, various other numbers, configurations, or arrangements of such components or portions of the lower floor may be included in an example block of the flexible, robotic automated storage and retrieval system.

Figure 7:
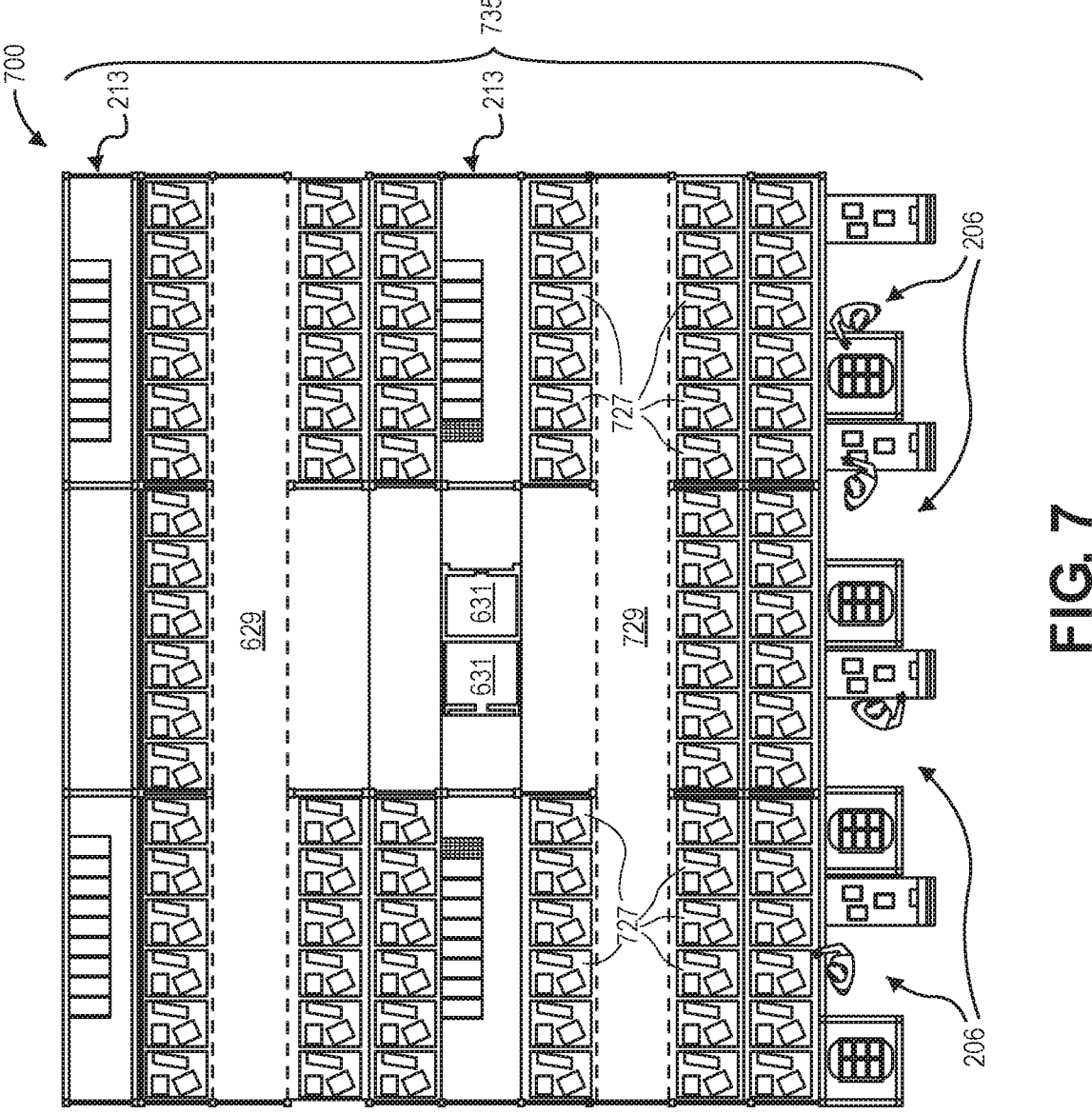
FIG. 7 is a schematic, overhead view diagram of an example upper floor of a flexible, robotic automated storage and retrieval system, in accordance with implementations of the present disclosure.

FIG. 7 is a schematic, overhead view diagram 700 of an example upper floor of a flexible, robotic automated storage and retrieval system, in accordance with implementations of the present disclosure.

An example upper floor 735 of an example block of the flexible, robotic automated storage and retrieval system 205 may include a plurality of storage grid locations 627, 727, a plurality of highway grids 629, 729, and one or more elevators 631. In addition, as described herein, the example upper floor 735 may include one or more service access zones 213. Further, as described herein and as partially visible in FIG. 7, the lowest floor of the example block may include one or more processing stations 206.

Each storage grid location 627, 727 may be sized or configured to receive a respective tote and to enable movement of robotic drive units and/or totes on a surface of the storage grid location 627, 727. In addition, the highway grids 629, 729 may be sized or configured to enable movement of robotic drive units and/or totes on surfaces of the highway grids 629, 729 between storage grid locations 627, 727, elevators 631, processing stations 206, and/or other portions of the block. Further, the elevators 631 may also be sized or configured to receive robotic drive units and/or totes, and enable movement of the robotic drive units and/or totes on surfaces of the elevators 631 between floors of the block. In contrast, the service access zones 213 may be restricted zones that do not allow access or movement by robotic drive units and/or totes, and may include physical barriers, walls, rails, or fences to maintain such restrictions.

The plurality of storage grid locations 627, 727, the plurality of highway grids 629, 729, and the one or more elevators 631 may include a plurality of fiducial markers, e.g., barcodes, QR codes, characters, symbols, RFID tags, or other identifiers, that are positioned at various locations of the floor, e.g., in one or more grid patterns on the floor that substantially match the plurality of storage grid locations 627, 727 and corresponding portions of surfaces of the plurality of highway grids 629, 729 and one or more elevators 631. In this manner, robotic drive units may be able to traverse among the plurality of storage grid locations 627, 727, the plurality of highway grids 629, 729, and the one or more elevators 631 between all floors of the block to move or transfer totes, or perform various other operations, by detecting the plurality of fiducial markers during movement to identify and maintain their respective locations within the block.

Although FIG. 7 illustrates a particular number, configuration, and arrangement of an upper floor 735 having storage grid locations 627, 727, highway grids 629, 729, elevators 631, processing stations 206, service access zones 213, and associated fiducial markers to facilitate robotic drive unit operations, in other example embodiments, various other numbers, configurations, or arrangements of such components or portions of the upper floor may be included in an example block of the flexible, robotic automated storage and retrieval system.

Figure 8:
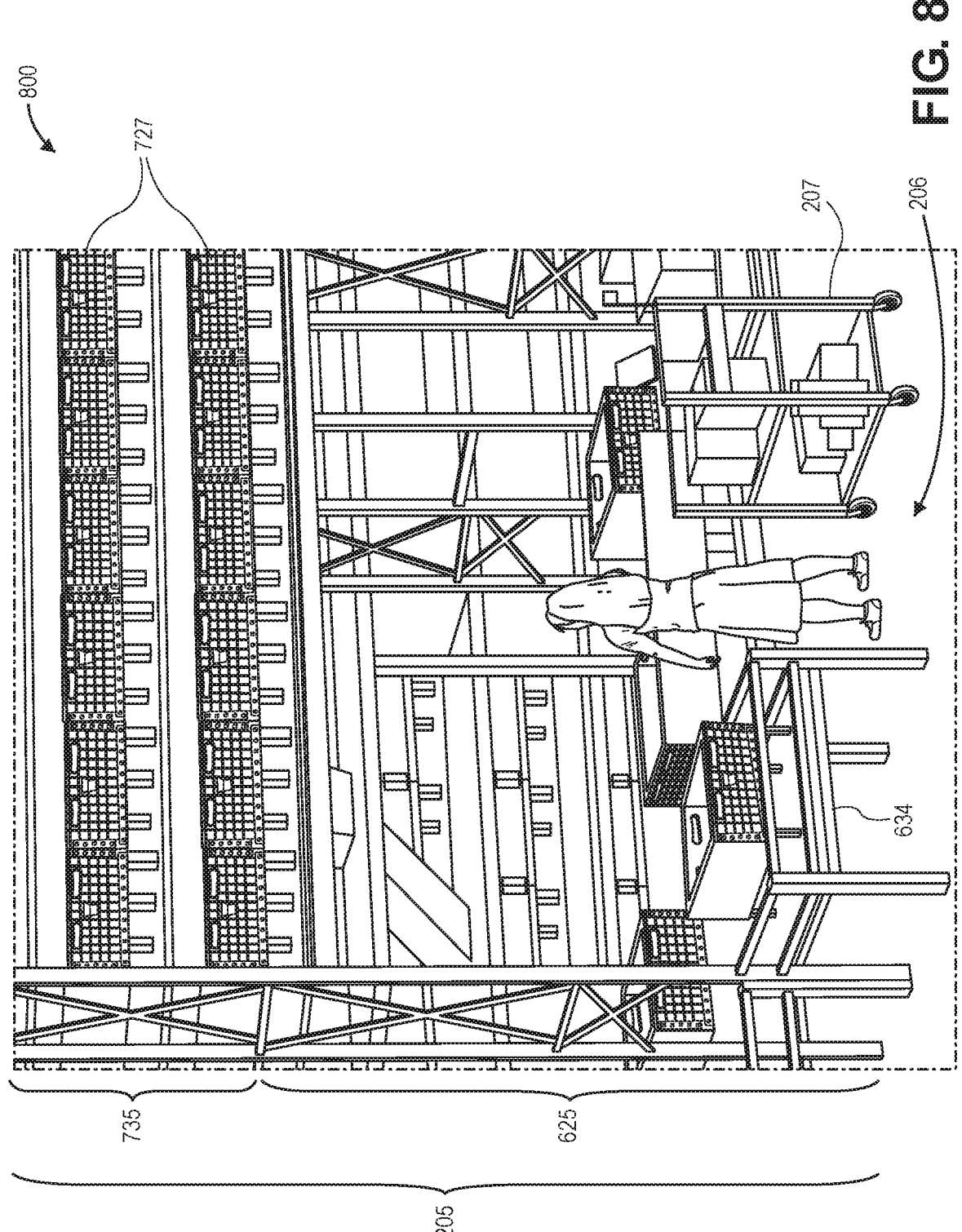
FIG. 8 is a schematic, perspective view diagram of an example processing station of a flexible, robotic automated storage and retrieval system, in accordance with implementations of the present disclosure.

FIG. 8 is a schematic, perspective view diagram 800 of an example processing station of a flexible, robotic automated storage and retrieval system, in accordance with implementations of the present disclosure.

As shown in FIG. 8, an example processing station 206 may be positioned at a lowest floor of an example block of the flexible, robotic automated storage and retrieval system 205 having a plurality of lower floors 625 and a plurality of upper floors 735. Each of the floors 625, 735 may include a plurality of storage grid locations 627, 727, plurality of highway grids 629, 729, one or more elevators 631, and a plurality of service access zones 213, as described herein.

Each processing station 206 may be associated with a plurality of locations to which robotic drive units may move based on fiducial markers on the floor, e.g., "entry queue" locations, "on deck" locations, "pick" locations, "place" locations 634, "exit queue" locations, and other locations. In addition, each processing station 206 may be utilized to perform one or more processes or operations, such as item receive/stow processes, item pick/place processes, item sorting or storing processes to order totes, customer totes, restock totes, or other types of totes, and/or various other processes or operations. Further, each processing station 206 may dynamically change its particular process or operation over time, e.g., as needed to meet processing requirements for the flexible, robotic automated storage and retrieval system.

For example, during the item receive/stow processes, an item may be received at the processing station 206 via the cart 207. The location, e.g., block, floor, and storage grid location, of a tote to which the item is to be stowed may be identified. A robotic drive unit may be instructed to move to the location of the tote using the highway grids and/or elevators. Once at the location, the robotic drive unit may engage and lift the tote, and then move the tote to the processing station 206 using the highway grids and/or elevators. When the robotic drive unit has moved the tote to the "pick" location of the processing station 206, the human associate may be instructed to place the item from the cart 207 into the tote carried by the robotic drive unit at the "pick" location. Then, a desired location, e.g., block, floor, and storage grid location, for the tote to which the item has been stowed may be identified. The robotic drive unit may be instructed to move to the desired location for the tote using the highway grids and/or elevators. Once at the desired location, the robotic drive unit may disengage, lower, and place the tote.

In another example, during the item receive/stow processes, a tote having one or more items may be received at the processing station 206 via the cart 207. A robotic drive unit may be instructed to move to the processing station 206 using the highway grids and/or elevators. When the robotic drive unit has moved to the "pick" location of the processing station 206, the human associate may be instructed to place the tote from the cart 207 onto the robotic drive unit at the "pick" location. Then, a desired location, e.g., block, floor, and storage grid location, for the tote having one or more items may be identified. The robotic drive unit may be instructed to move to the desired location for the tote using the highway grids and/or elevators. Once at the desired location, the robotic drive unit may disengage, lower, and place the tote.

Further, during the item pick/place processes, an item to be picked may be identified. The location, e.g., block, floor, and storage grid location, of a tote having the item to be picked may be identified. A robotic drive unit may be instructed to move to the location of the tote using the highway grids and/or elevators. Once at the location, the robotic drive unit may engage and lift the tote, and then move the tote to the processing station 206 using the highway grids and/or elevators. When the robotic drive unit has moved the tote to the "pick" location of the processing station 206, the human associate may be instructed to pick the item from the tote carried by the robotic drive unit at the "pick" location, and the human associate may be instructed to place the item either on the cart 207 or in a tote positioned at the "place" location 634. Then, a desired location, e.g., block, floor, and storage grid location, for the tote from which the item has been picked may be identified. The robotic drive unit may be instructed to move to the desired location for the tote using the highway grids and/or elevators. Once at the desired location, the robotic drive unit may disengage, lower, and place the tote.

As another example, during the item pick/place processes, a tote to be picked may be identified. The location, e.g., block, floor, and storage grid location, of the tote to be picked may be identified. A robotic drive unit may be instructed to move to the location of the tote using the highway grids and/or elevators. Once at the location, the robotic drive unit may engage and lift the tote, and then move the tote to the processing station 206 using the highway grids and/or elevators. When the robotic drive unit has moved the tote to the "pick" location of the processing station 206, the human associate may be instructed to pick the tote carried by the robotic drive unit at the "pick" location, and the human associate may be instructed to place the tote either on the cart 207 or at the "place" location 634. Alternatively, the robotic drive unit may move the tote to the "place" location 634 without intervention by the human associate, and the robotic drive unit may disengage, lower, and place the tote at the "place" location 634.

Totes and/or items picked and placed at the "place" location 634 may include one or more items that have been sorted or consolidated for customer orders or deliveries and/or restocking or replenishment operations. In some example embodiments, after sorting or consolidating customer orders and/or restocking operations, the human associate may be instructed to move the one or more items from the tote at the "place" location 634 to the cart 207. In other example embodiments, after sorting or consolidating customer orders and/or restocking operations, a desired location, e.g., block, floor, and storage grid location, to store the tote may be identified. A robotic drive unit may be instructed to move the tote to the desired location for the tote using the highway grids and/or elevators. Once at the desired location, the robotic drive unit may disengage, lower, and place the tote. Later, responsive to a determination that a sorted or consolidated customer order and/or restocking operation is to be retrieved, the location, e.g., block, floor, and storage grid location, of the stored tote may be identified. A robotic drive unit may be instructed to move to the location of the tote using the highway grids and/or elevators. Once at the location, the robotic drive unit may engage and lift the tote, and then move the tote to the processing station 206 using the highway grids and/or elevators. When the robotic drive unit has moved the tote to the "pick" location of the processing station 206, the human associate may be instructed to pick the tote and/or items carried by the robotic drive unit at the "pick" location, and the human associate may be instructed to place the tote and/or items on the cart 207.

In addition, totes and/or items picked and placed on the cart 207 may include one or more items that have been sorted or consolidated for customer orders or deliveries and/or restocking or replenishment operations. The cart 207 may then be moved to one or more downstream processes, such as the outbound docks for delivery of customer orders via one or more vehicles, the front-of-store area for use by customers to continue or finish shopping, and/or the front-of-store area for use by employees or personnel to restock or replenish items.

Moreover, a control system (such as the control system described with respect to FIG. 12), may be in communication with each of the robotic drive units, elevators, and/or processing stations, and may send and/or receive commands, instructions, and/or data to control or coordinate operations of the various components of the flexible, robotic automated storage and retrieval system. For example, the control system may control, instruct, or coordinate movement of robotic drive units to perform item receive/stow, item pick/place, and/or other processes. In addition, the control system may control, instruct, or coordinate movement of robotic drive units and elevators to facilitate movement of robotic drive units and totes between blocks, floors, storage grid locations, and processing stations of the system. Further, the control system may control, instruct, or coordinate operations of the processing stations, robotic drive units, and elevators to facilitate the various processes and operations associated with totes and/or items contained therein. Further details of the control system are described herein at least with respect to FIG. 12.

Figure 9:
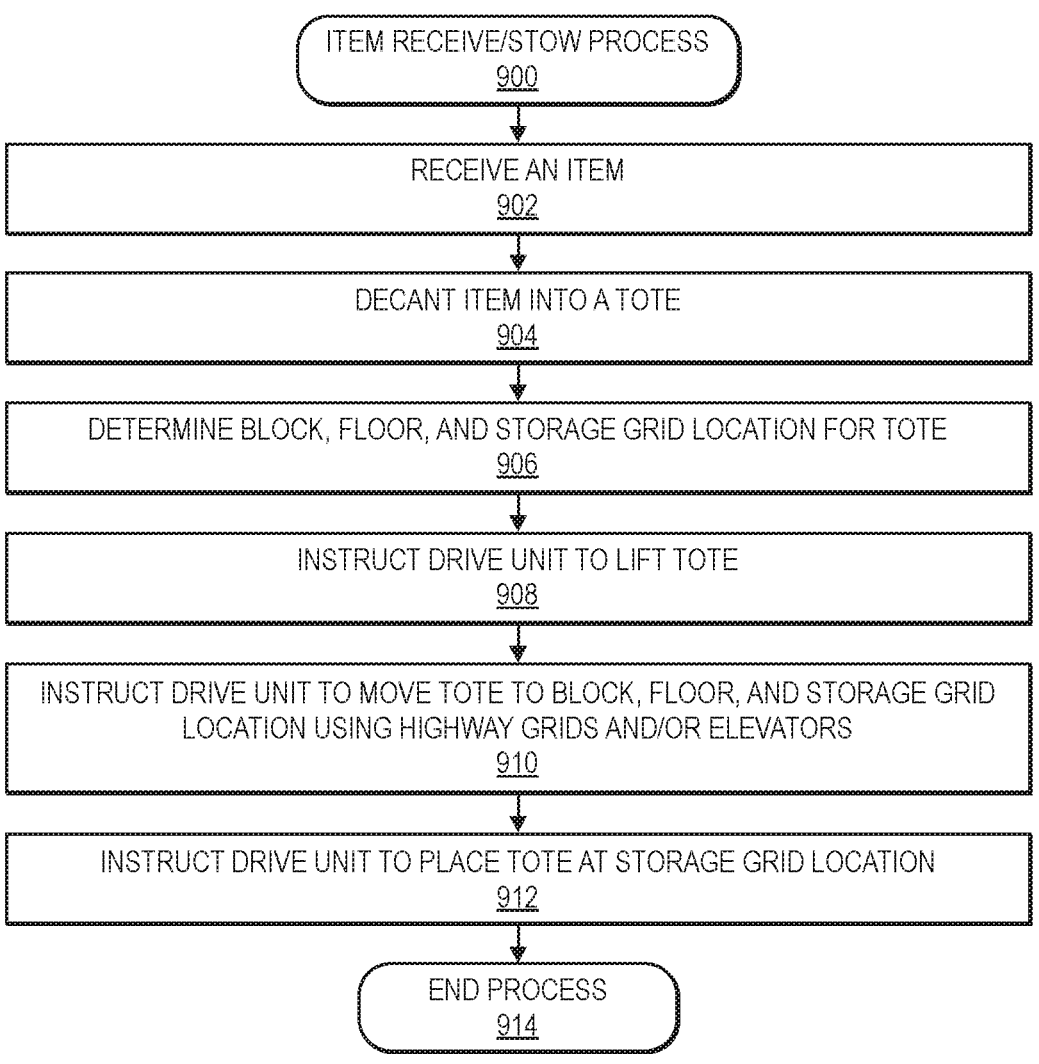
FIG. 9 is a flow diagram illustrating an example item receive/stow process, in accordance with implementations of the present disclosure.

FIG. 9 is a flow diagram illustrating an example item receive/stow process 900, in accordance with implementations of the present disclosure.

The process 900 may begin by receiving an item, as at 902. For example, an item may be received at an inbound dock associated with the flexible, robotic automated storage and retrieval system. An identity of the item may be determined, e.g., by scanning a barcode, QR code, label, or other identifier associated with the item, and the identity may be stored in association with the received item. In addition, the item may be received by human associates, using robotic or automated machinery, or combinations thereof. Further, a control system may instruct or command the various operations associated with receiving an item.

The process 900 may continue by decanting the item into a tote, as at 904. For example, the item may be sorted or separated from a plurality of received items, and the item may be decanted, moved, or placed into a tote. An identity of the tote may be determined, e.g., by scanning a barcode, QR code, label, or other identifier associated with the tote, and the identity of the tote may be stored in association with the received item. In addition, the item may be decanted into the tote at one or more processing stations, e.g., by human associates, using robotic or automated machinery, or combinations thereof, associated with the flexible, robotic automated storage and retrieval system. Further, a control system may instruct or command the various operations associated with decanting the received item.

The process 900 may proceed by determining a block, floor, and storage grid location for the tote, as at 906. For example, each storage grid location within a flexible, robotic automated storage and retrieval system may have an associated unique identifier, e.g., such as a unique fiducial marker at each storage grid location. The unique identifier of the determined or desired storage grid location may be stored in association with the identity of the tote and the received item. Further, a control system may instruct or command the various operations associated with determining a desired storage grid location for the tote.

The process 900 may then continue to instruct a robotic drive unit to lift the tote, as at 908. For example, a robotic drive unit may be instructed to move to a current location of the tote, e.g., a "pick" location of a processing station associated with the tote. When the robotic drive unit is positioned under the tote, the robotic drive unit may engage and lift the tote using a tote lift mechanism. Further, a control system may instruct or command the various operations associated with instructing the robotic drive unit to lift the tote.

The process 900 may then proceed to instruct the robotic drive unit to move the tote to the block, floor, and storage grid location using the highway grids and/or elevators, as at 910. For example, by detecting, identifying, and following fiducial markers positioned along the highway grids and/or elevators, the robotic drive unit may move the tote to the desired block, floor, and storage grid location as determined for the tote. Further, a control system may instruct or command the various operations associated with instructing the robotic drive unit to move the tote to the desired storage grid location.

The process 900 may continue with instructing the robotic drive unit to place the tote at the storage grid location, as at 912. For example, when the robotic drive unit is positioned at the fiducial marker associated with the desired storage grid location, the robotic drive unit may disengage, lower, and place the tote at the desired storage grid location using the tote lift mechanism. As described herein, the unique identifier of the desired storage grid location may be stored in association with the identity of the tote and the received item, in order to facilitate later retrieval of the tote and the item from the storage grid location. Further, a control system may instruct or command the various operations associated with instructing the robotic drive unit to place the tote.

The process 900 may then end, as at 914.

FIG. 10 is a flow diagram illustrating an example item pick/place process 1000, in accordance with implementations of the present disclosure.

The process 1000 may begin by identifying a block, floor, and storage grid location of a tote, as at 1002. For example, each storage grid location within a flexible, robotic automated storage and retrieval system may have an associated unique identifier, e.g., such as a unique fiducial marker at each storage grid location. The unique identifier of the storage grid location may be stored in association with the identity of the desired tote and/or items contained therein. Further, a control system may instruct or command the various operations associated with identifying a storage grid location of the desired tote.

The process 1000 may continue by instructing a robotic drive unit to move to the tote at the block, floor, and storage grid location using the highway grids and/or elevators, as at 1004. For example, by detecting, identifying, and following fiducial markers positioned along the highway grids and/or elevators, the robotic drive unit may move to the desired tote at the block, floor, and storage grid location as identified for the desired tote. Further, a control system may instruct or command the various operations associated with instructing the robotic drive unit to move to the desired tote at the storage grid location.

The process 1000 may proceed by instructing the robotic drive unit to lift the tote at the storage grid location, as at 1006. For example, when the robotic drive unit is positioned at the storage grid location under the desired tote, the robotic drive unit may engage and lift the desired tote using a tote lift mechanism. Further, a control system may instruct or command the various operations associated with instructing the robotic drive unit to lift the desired tote.

The process 1000 may then continue to instruct the robotic drive unit to move the tote to a processing station using the highway grids and/or elevators, as at 1008. For example, by detecting, identifying, and following fiducial markers positioned along the highway grids and/or elevators, the robotic drive unit may move the desired tote to a processing station as determined for the desired tote. The processing station may be determined to perform a desired operation or process with respect to the tote and/or items contained therein. Further, a control system may instruct or command the various operations associated with instructing the robotic drive unit to move the desired tote to the processing station.

The process 1000 may then proceed to process the tote at the processing station, as at 1010. For example, an item may be stowed to the tote, an item may be picked from the tote, the tote may be removed from the robotic drive unit, and/or various other operations or processes described herein may be performed at the processing station with respect to the tote and/or items contained therein. In addition, the tote and/or items contained therein may be processed at one or more processing stations, e.g., by human associates, using robotic or automated machinery, or combinations thereof, associated with the flexible, robotic automated storage and retrieval system. Further, a control system may instruct or command the various operations associated with processing the desired tote at the processing station.

The process 1000 may continue with identifying a block, floor, and storage grid location for the tote, as at 1012. For example, each storage grid location within a flexible, robotic automated storage and retrieval system may have an associated unique identifier, e.g., such as a unique fiducial marker at each storage grid location. The unique identifier of the identified or desired storage grid location may be stored in association with the identity of the tote and/or items contained therein. Further, a control system may instruct or command the various operations associated with identifying a desired storage grid location for the tote.

The process 1000 may then proceed to instruct the robotic drive unit to move the tote to the block, floor, and storage grid location using the highway grids and/or elevators, as at 1014. For example, by detecting, identifying, and following fiducial markers positioned along the highway grids and/or elevators, the robotic drive unit may move the tote to the desired block, floor, and storage grid location as determined for the tote. Further, a control system may instruct or command the various operations associated with instructing the robotic drive unit to move the tote to the desired storage grid location.

The process 1000 may continue with instructing the robotic drive unit to place the tote at the storage grid location, as at 1016. For example, when the robotic drive unit is positioned at the fiducial marker associated with the desired storage grid location, the robotic drive unit may disengage, lower, and place the tote at the desired storage grid location using the tote lift mechanism. As described herein, the unique identifier of the desired storage grid location may be stored in association with the identity of the tote and/or items contained therein, in order to facilitate later retrieval of the tote and/or items from the storage grid location. Further, a control system may instruct or command the various operations associated with instructing the robotic drive unit to place the tote.

The process 1000 may then end, as at 1018.

In further example embodiments, in addition to stow operations and pick operations described herein at least with respect to FIGS. 9 and 10, a robotic drive unit may perform various other types of operations, which may collectively be referred to herein as reconfiguration operations. For example, a robotic drive unit may retrieve a desired tote from a storage location, e.g., a dense or buried location that may require moving one or more other totes in order to reach the desired tote, which may assist another robotic drive unit that is tasked with retrieving and transporting the desired tote to a processing station. In addition, a robotic drive unit may stow a tote to a desired storage location, e.g., a dense or buried location that may require moving one or more other totes in order to reach the desired storage location, which may assist another robotic drive unit that is tasked with transporting the tote from a processing station. Moreover, a robotic drive unit may rearrange or reposition one or more totes between storage locations to assist various storage and/or retrieval tasks of other robotic drive units. Further, a robotic drive unit may rearrange or reposition one or more totes to assist various service or maintenance processes, such as enabling access to portions of the system by maintenance personnel, machinery, or equipment. Still further, a robotic drive unit may be tasked with performing inventory and/or location checks of one or more totes, searching for and finding one or more missing totes, identifying and correcting errors related to data associations between expected storage locations of totes and actual storage locations of totes, and/or other exceptions or maintenance tasks.

Generally, any robotic drive unit may perform any of the tasks described herein, and one or more portions of such tasks may be divided among a plurality of robotic drive units in various combinations, in serial or in parallel, in order to achieve the desired efficiency and/or throughput of the system. In addition, the assignment of particular portions of tasks to robotic drive units may change over time. For example, one or more robotic drive units may primarily perform tasks related to transporting totes, one or more robotic drive units may primarily perform tasks related to stowing totes to storage locations, one or more robotic drive units may primarily perform tasks related to retrieving totes from storage locations, one or more robotic drive units may primarily perform tasks related to rearranging or repositioning totes, one or more robotic drive units may primarily perform tasks related to enabling access for service and maintenance of portions of the system, one or more robotic drive units may primarily perform tasks related to resolving exceptions, etc.

Figure 11:
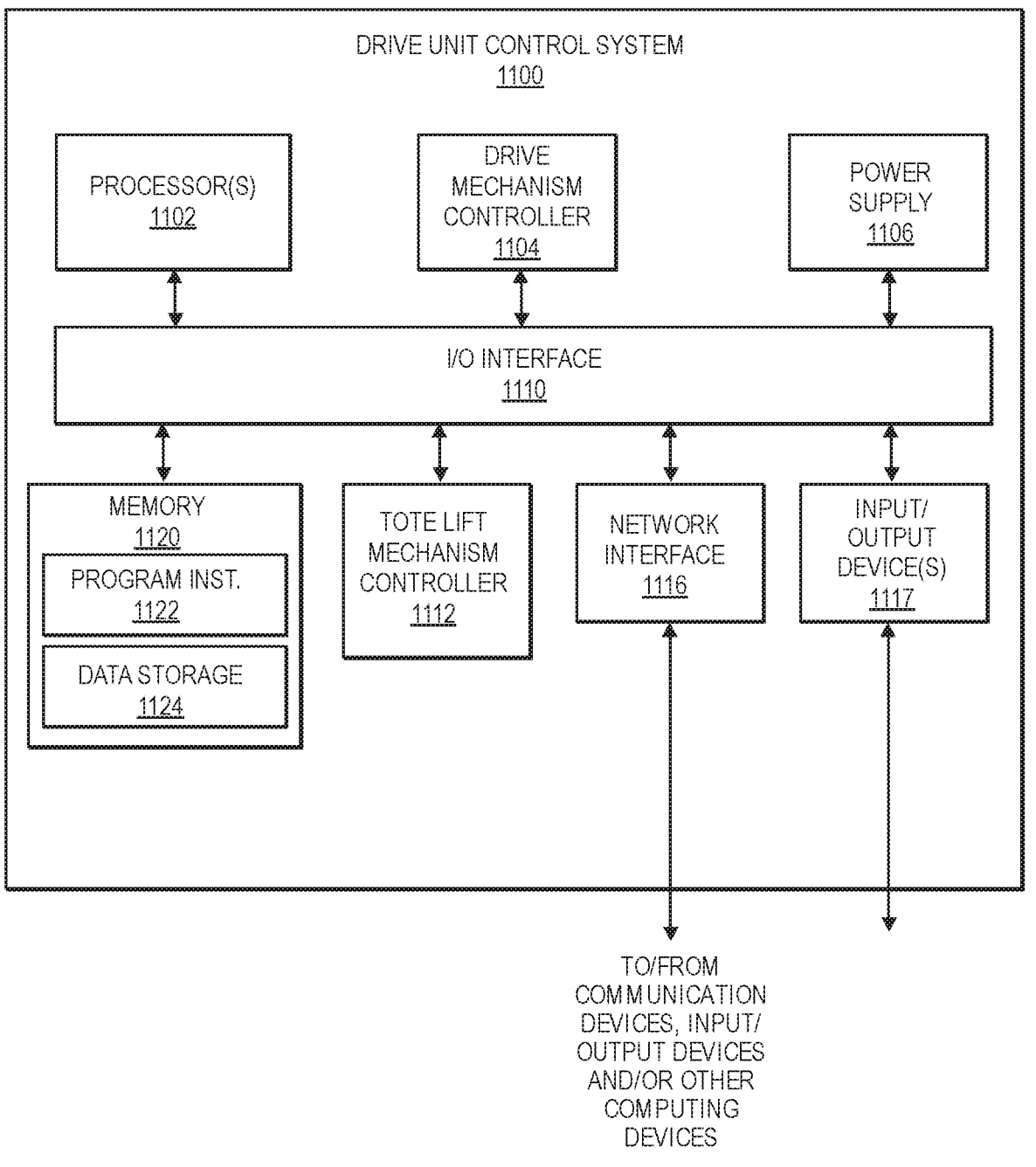
FIG. 11 is a block diagram illustrating various components of an example drive unit control system, in accordance with implementations of the present disclosure.

FIG. 11 is a block diagram illustrating various components of an example drive unit control system 1100, in accordance with implementations of the present disclosure.

In various examples, the block diagram may be illustrative of one or more aspects of a robotic drive unit controller or control system 1100 that may be used to implement the various systems and processes discussed above. In the illustrated implementation, the drive unit control system 1100 includes one or more processors 1102, coupled to a non-transitory computer readable storage medium 1120 via an input/output (I/O) interface 1110. The drive unit control system 1100 may also include a drive mechanism controller 1104 and a power supply or battery 1106. The drive unit control system 1100 may further include a tote lift mechanism controller 1112, a network interface 1116, and one or more input/output devices 1117.

In various implementations, the drive unit control system 1100 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, applications, drivers, and/or data, such as drive unit data, tote data, item data, path or destination data, position or location data, fiducial marker data, block, floor, and/or storage grid location data, drive mechanism data, tote lift mechanism data, elevator data, processing station data, sensor data, and/or other data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122 and data storage 1124. In other implementations, program instructions, applications, drivers, and/or data may be received, sent or stored upon different types of computer-accessible media, such as non-transitory media, or on similar media separate from the non-transitory computer readable storage medium 1120 or the drive unit control system 1100.

Generally, a non-transitory, computer readable storage medium may include storage media or memory media such as magnetic or optical media, e.g., disk or CD/DVD-ROM, coupled to the drive unit control system 1100 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface 1116 or other peripheral interfaces, such as input/output devices 1117. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The drive mechanism controller 1104 may communicate with the processor(s) 1102, the non-transitory computer readable storage medium 1120, and/or other components described herein to adjust the operational characteristics of motors or other actuators associated with each drive mechanism to move the drive unit along a determined path to a destination and/or to perform other navigational maneuvers or operations.

The drive unit control system 1100 may also include a tote lift mechanism controller 1112 that communicates with the processor(s) 1102, the non-transitory computer readable storage medium 1120, and/or other components described herein to engage, lift, move, lower, disengage, and/or place respective totes carried by the drive unit.

The network interface 1116 may be configured to allow data to be exchanged between the drive unit control system 1100, other devices attached to a network, such as other computer systems, flexible, robotic automated storage and retrieval system controllers, elevators, processing stations, control systems of other drive units, and/or other vehicles, systems, machines, equipment, apparatuses, systems, sensors, or devices associated with the flexible, robotic automated storage and retrieval system. For example, the network interface 1116 may enable wireless communication between numerous drive units. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1117 may, in some implementations, include one or more visual input/output devices, audio input/output devices, displays, imaging sensors, thermal sensors, infrared sensors, time of flight sensors, accelerometers, various other sensors described herein, etc. Multiple input/output devices 1117 may be present and controlled by the drive unit control system 1100. One or more of these sensors may be utilized to assist in performing the various functions, operations, and processes described herein.

As shown in FIG. 11, the memory may include program instructions 1122 which may be configured to implement the example processes and/or sub-processes described above. The data storage 1124 may include various data stores for maintaining data items that may be provided for performing the various functions, operations, and processes described herein. For example, the data storage 1124 may include drive unit data, tote data, item data, path or destination data, position or location data, fiducial marker data, block, floor, and/or storage grid location data, drive mechanism data, tote lift mechanism data, elevator data, processing station data, sensor data, and/or other data items.

Those skilled in the art will appreciate that the drive unit control system 1100 is merely illustrative and is not intended to limit the scope of the present disclosure. In particular, the computing system and devices may include any combination of hardware or software that can perform the indicated functions, including other control systems or controllers, computers, network devices, robotic devices, etc. The drive unit control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 12:
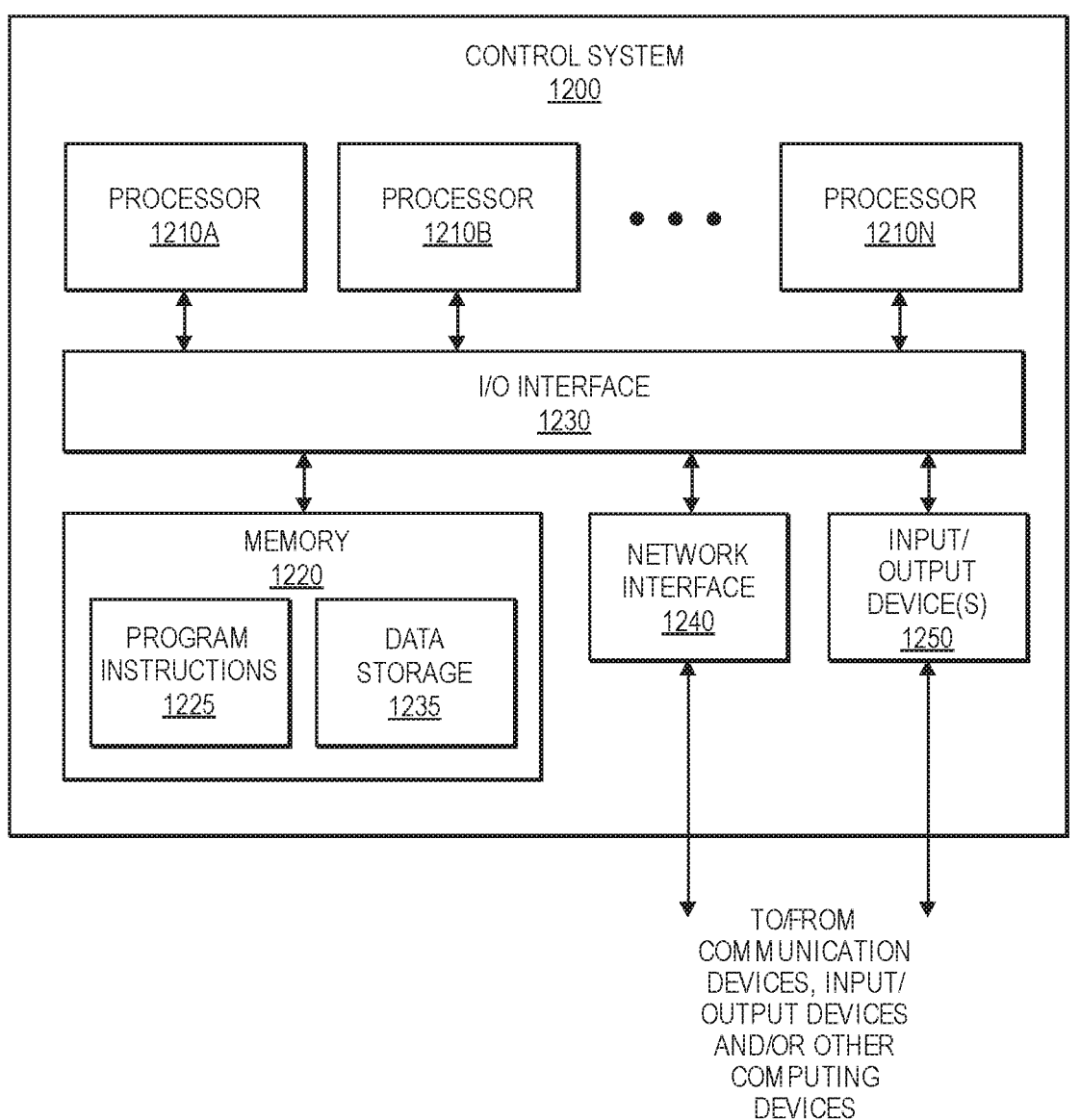
FIG. 12 is a block diagram illustrating various components of an example control system, in accordance with implementations of the present disclosure.

FIG. 12 is a block diagram illustrating various components of an example control system 1200, in accordance with implementations of the present disclosure.

Various operations of a control system or controller 1200, such as those described herein, may be executed on one or more computer systems, and/or interacting with various other computers, systems, or devices of a flexible, robotic automated storage and retrieval system, according to various implementations. For example, the control system or controller 1200 discussed above may function and operate on one or more computer systems. In the illustrated implementation, a control system 1200 includes one or more processors 1210A, 1210B through 1210N, coupled to a non-transitory computer-readable storage medium 1220 via an input/output (I/O) interface 1230. The control system 1200 further includes a network interface 1240 coupled to the I/O interface 1230, and one or more input/output devices 1250. In some implementations, it is contemplated that a described implementation may be implemented using a single instance of the control system 1200 while, in other implementations, multiple such systems or multiple nodes making up the control system 1200 may be configured to host different portions or instances of the described implementations. For example, in one implementation, some data sources or services (e.g., related to portions of the flexible, robotic automated storage and retrieval systems, operations, or processes, etc.) may be implemented via one or more nodes of the control system 1200 that are distinct from those nodes implementing other data sources or services (e.g., related to other portions of the flexible, robotic automated storage and retrieval systems, operations, or processes, etc.).

In various implementations, the control system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 1200. Generally speaking, a non-transitory, computer-readable storage medium may include storage media or memory media such as magnetic or optical media, e.g., disk or CD/DVD-ROM, coupled to the control system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the control system 1200 and other devices attached to a network, such as other computer systems, material handling system controllers, warehouse, retail, or facility management systems, other automated storage and retrieval system control systems, control systems of drive units, processing stations, various types of sensors, upstream stations or processes, downstream stations or processes, other material handling systems or equipment, or between nodes of the control system 1200. In various implementations, the network interface 1240 may support communication via wired or wireless general data networks, such as any suitable type of Ethernet network.

Input/output devices 1250 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, various other sensors described herein, or any other devices suitable for entering or retrieving data by one or more control systems 1200. Multiple input/output devices 1250 may be present in the control system 1200 or may be distributed on various nodes of the control system 1200. In some implementations, similar input/output devices may be separate from the control system 1200 and may interact with one or more nodes of the control system 1200 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate flexible, robotic automated storage and retrieval systems, operations, and processes described herein, such as processing station controllers, drivers, or applications, elevator controllers, drivers, or applications, drive unit controllers, drivers, or applications, drive unit path and destination determination controllers, drivers, or applications, sensor controllers, drivers, or applications, sensor data processing applications, material handling equipment controllers, drivers, or applications, etc. The data storage 1235 may include various data stores for maintaining data related to flexible, robotic automated storage and retrieval systems, operations, or processes described herein, such as processing station data, elevator data, drive unit data, tote data, item data, path or destination data, position or location data, fiducial marker data, block, floor, and/or storage grid location data, drive mechanism data, tote lift mechanism data, sensor data, other material handling equipment or apparatus data, and/or other data items.

Those skilled in the art will appreciate that the control system 1200 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 9 and 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated storage and retrieval system, comprising:
   a plurality of floors, individual floors including a plurality of storage grid locations connected via a plurality of highway grids;
   a plurality of elevators connecting the plurality of floors;
   a plurality of totes, individual totes being positioned at respective storage grid locations, and individual totes being configured to receive respective items;
   a plurality of robotic drive units configured to traverse the plurality of floors and the plurality of storage grid locations by traveling on respective surfaces of the plurality of highway grids, the plurality of elevators, and the plurality of storage grid locations, individual robotic drive units configured to lift, move, and place respective totes;
   a plurality of processing stations associated with the automated storage and retrieval system, individual processing stations configured to process items associated with respective totes; and
   a plurality of service access zones associated with the automated storage and retrieval system, the plurality of service access zones configured to enable access to the plurality of floors, the plurality of storage grid locations, the plurality of highway grids, and the plurality of elevators.

2. The automated storage and retrieval system of claim 1, wherein respective heights of the individual floors are configured to enable lifting, movement, and placement of respective totes by the individual robotic drive units.

3. The automated storage and retrieval system of claim 1, wherein the plurality of processing stations are positioned at a lowest floor of the plurality of floors.

4. The automated storage and retrieval system of claim 1, wherein at least a portion of the plurality of service access zones is positioned adjacent to at least one of a storage grid location, a highway grid, or an elevator within an interior of the automated storage and retrieval system.

5. A system, comprising:
a plurality of floors, individual floors including a plurality of storage grid locations and a plurality of highway grids, and individual storage grid locations configured to receive respective totes;
at least one elevator configured to traverse the plurality of floors; and
a robotic drive unit configured to traverse the plurality of storage grid locations via respective surfaces of the plurality of highway grids, the at least one elevator, and the plurality of storage grid locations, the robotic drive unit configured to move a respective tote.

6. The system of claim 5, further comprising:
at least one service access zone configured to enable access to at least a portion of the plurality of floors, the plurality of storage grid locations, the plurality of highway grids, and the at least one elevator.

7. The system of claim 6, wherein at least a portion of the at least one service access zone is positioned adjacent to at least one of a storage grid location, a highway grid, or the at least one elevator within an interior of the system.

8. The system of claim 5, further comprising:
at least one processing station configured to process an item associated with a respective tote.

9. The system of claim 8, wherein the at least one processing station is positioned at a lowest floor of the plurality of floors;
wherein a first number of lower floors of the plurality of floors each includes a first number of storage grid locations, the first number of lower floors including the lowest floor; and wherein a second number of upper floors of the plurality of floors each includes a second number of storage grid locations.

10. The system of claim 5, wherein respective heights of the individual floors are configured to enable movement of the respective tote by the robotic drive unit.

11. The system of claim 5, wherein the respective tote includes a plurality of legs; and
wherein the robotic drive unit is configured to traverse under the respective tote between the plurality of legs; and
wherein the robotic drive unit is configured to lift and move the respective tote between respective storage grid locations.

12. The system of claim 5, wherein the robotic drive unit is configured to traverse the plurality of storage grid locations via the respective surfaces of the plurality of highway grids, the at least one elevator, and the plurality of storage grid locations using a plurality of fiducial markers associated with the plurality of floors.

13. The system of claim 5, wherein the robotic drive unit is configured to move the respective tote to perform at least one of a stow operation, a pick operation, or a reconfiguration operation.

14. The system of claim 5, further comprising:
a controller configured to at least:
determine a respective floor and a respective storage grid location associated with the respective tote;
instruct the robotic drive unit to move to the respective tote at the respective floor and the respective storage grid location via at least a portion of the plurality of highway grids and the at least one elevator;
instruct the robotic drive unit to move the respective tote to at least one processing station; and
instruct processing of an item associated with the respective tote at the at least one processing station.

15. The system of claim 14, wherein the controller is further configured to at least:
determine a desired floor and a desired storage grid location for the respective tote; and
instruct the robotic drive unit to move the respective tote to the desired floor and the desired storage grid location via at least a portion of the plurality of highway grids and the at least one elevator.

* * * * *